United States Patent
Hosoya et al.

(10) Patent No.: US 9,375,802 B2
(45) Date of Patent: Jun. 28, 2016

(54) PLASMA ARC WELDING METHOD AND PLASMA ARC WELDING DEVICE

(71) Applicant: HITACHI CONSTRUCTION MACHINERY CO., LTD., Tokyo (JP)

(72) Inventors: Kazumichi Hosoya, Tsuchiura (JP); Hikaru Yamamoto, Tsuchiura (JP); Toru Nakajima, Tsuchiura (JP); Toyoyuki Sato, Tokyo (JP); Katsunori Wada, Tokyo (JP); Shuhei Kanemaru, Tokyo (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 124 days.

(21) Appl. No.: 14/358,655

(22) PCT Filed: Nov. 16, 2012

(86) PCT No.: PCT/JP2012/079746
§ 371 (c)(1),
(2) Date: May 15, 2014

(87) PCT Pub. No.: WO2013/073655
PCT Pub. Date: May 23, 2013

(65) Prior Publication Data
US 2014/0312012 A1    Oct. 23, 2014

(30) Foreign Application Priority Data
Nov. 17, 2011 (JP) .................................. 2011-251738

(51) Int. Cl.
*B23K 10/00* (2006.01)
*B23K 10/02* (2006.01)

(52) U.S. Cl.
CPC ............... *B23K 10/02* (2013.01); *B23K 10/006* (2013.01)

(58) Field of Classification Search
CPC ...... B23K 10/00; B23K 10/02; B23K 10/006; B23K 9/09; B23K 9/093; B23K 9/095; H05H 1/26; H05H 1/36
USPC ............ 219/121.45, 121.46, 121.59, 121.48, 219/121.54, 121.57, 130.1, 130, 21, 130.51
See application file for complete search history.

(56) References Cited

U.S. PATENT DOCUMENTS 4,595,820 A * 6/1986 Richardson .......... B23K 9/0956
219/130.01
4,711,986 A * 12/1987 Lillquist ................ B23K 9/296
219/130.01

(Continued)

FOREIGN PATENT DOCUMENTS

JP    60-027473 A    2/1985
JP    07-214330 A    8/1995

(Continued)

*Primary Examiner* — Mark Paschall
(74) *Attorney, Agent, or Firm* — Volpe and Koenig, P.C.

(57) ABSTRACT

Provided is a plasma arc welding method for continuously welding a welding target part of a welding workpiece while forming a keyhole weld on the welding target part of the welding workpiece using a plasma arc. A pulse current is used for a welding current, and the pulse frequency of the pulse current is controlled so as to be a frequency that is synchronized with a weld pool (P) during the welding. With this approach, vibration of the weld pool during keyhole welding can be controlled so as to synchronize with the pulse frequency of the pulse current. As a result, when the plasma arc keyhole welding is performed, a stable penetration bead having a desired height can be reliably obtained without hanging or irregularity.

5 Claims, 7 Drawing Sheets

(56) References Cited

U.S. PATENT DOCUMENTS 5,506,384 A * 4/1996 Yamaguchi .......... B23K 10/006
　　　　　　　　　　　　　　　　　　　　 219/121.54
6,977,357 B2 * 12/2005 Hsu .................... B23K 9/0953
　　　　　　　　　　　　　　　　　　　　 219/130.01
2011/0017712 A1 * 1/2011 Wada ...................... B23K 9/16
　　　　　　　　　　　　　　　　　　　　 219/121.46

FOREIGN PATENT DOCUMENTS

| | | |
|---|---|---|
| JP | 08-039259 A | 2/1996 |
| JP | 2002-178177 A | 6/2002 |

* cited by examiner $$0.8 \leq (f_I)/(f_P) \leq 1.0$$

$$1.0 < (f_I)/(f_P) \leq 2.0$$

$$3.0 < (f_I)/(f_p)$$
$$(f_I)/(f_p) \leq 0.8$$

PLASMA ARC WELDING METHOD AND PLASMA ARC WELDING DEVICE

TECHNICAL FIELD

The present invention relates to a plasma arc welding method that enables a high energy density, high speed and high quality welding, and a plasma arc welding device that enables a high energy density, high speed and high quality welding.

BACKGROUND ART

In general, the plasma arc welding has a higher energy density than other welding such as a gas metal arc (GMA) welding and a gas tungsten arc (GTA) welding. Thus, the plasma arc welding can perform keyhole welding, i.e., can cause the plasma arc to penetrate from a front face (upper face) of a welding base metal (matrix, mother material) to a back face (lower face) while the welding is performed. If the keyhole welding is possible, the welding from the back face of the base metal is unnecessary, and therefore the welding work efficiency is significantly improved. During the keyhole welding, however, the keyhole tends to take an unstable behavior because of various factors, such as the temperature increase of the base metal during the welding, the atmosphere temperature, and magnetic blow caused by grounding. Therefore, high quality welding is only possible by an experienced person, and the automation is difficult.

To deal with this problem, for example, Patent Literature (Japanese Patent Application Laid-Open (Kokai) Publication No. 60-27473) uses a pulse current as the welding current, and causes a plasma jet to pulsate (fluctuate) so as to blow off the molten metal in the form of small droplet. This can form a weld bead without dripping (dropping). Patent Literature 2 (Japanese Patent Application Laid-Open (Kokai) Publication No. 8-39259) proposes a keyhole welding method that changes the plasma gas flow rate in a pulsating manner to avoid deficiencies such as burning through of a molten pool.

LISTING OF REFERENCES

Patent Literatures

PATENT LITERATURE 1: Japanese Patent Application Laid-Open (Kokai) Publication No. 60-27473
PATENT LITERATURE 2: Japanese Patent Application Laid-Open (Kokai) Publication No. 8-39259

SUMMARY OF THE INVENTION

Problems to be Solved by the Invention

Because the welding method, such as that disclosed in Patent Literature 1, is a method for causing the plasma jet to pulsate and blow off the molten metal in the form of small droplet, an after-treatment is necessary for the small droplet of the blown-off molten metal. If the welding workpieces are steel pipes and they have to undergo the butt welding, removal of the small droplet of the molten metal that is blown off may be difficult. The welding method, such as that disclosed in Patent Literature 2, can avoid the deficiency such as burning through of the molten pool by alternately changing the plasma gas flow rate, like a pulse, but it is difficult to obtain a stable penetration bead having a constant height (desired height).

The present invention is proposed to address these problems, and an object of the present invention is to provide a novel plasma arc welding method that reliably provides a stable penetration bead having a desired height when the keyhole welding is performed, and a novel plasma arc welding device that surely provides a stable penetration bead having a desired height when the keyhole welding is performed.

Solution to Overcome the Problems

In order to overcome these problems, the inventors carried out intensive studies and experiments, and found that there was relationship between shaking or oscillating behavior (frequency) of the weld pool formed on (in) the back face of the base metal during the welding and the shape of the penetration bead. The inventors arrived at the present invention based on such finding.

Specifically, when the keyhole welding is carried out by the above-described plasma arc, as shown in FIG. 2, a weld pool P is formed on the back face of the base metal 15 by the melted base metal 15, which is melted by the heat of the plasma arc 16 generated from a welding torch 10. The weld pool extends in the longitudinal direction of the base metal 15, and is formed behind the keyhole (plasma arc) in the welding direction. The inventors found that the shaking movement (vibration) of the weld pool P in the forward and backward directions with respect to the welding direction created a stable penetration bead having a constant height (desired height). If the shaking movement (oscillation) of the weld pool P is too large, the molten metal drops. Thus, the inventors found that the shaking movement (vibration) of the weld pool P had a natural frequency (e.g., 30-40 Hz) in order to create a stable penetration bead having a desired height. The natural frequency of the weld pool changes with the material of the base metal 15, the size (mass) of the weld pool P, the viscosity of the weld pool, and other factors. With such finding, the inventors carried out further intensive studies on the shaking movement (oscillation) of the weld pool P. Then, the inventors found that the shaking movement (oscillation) of the weld pool P was significantly influenced by a pulse frequency of the pulse current, if the pulse current was used as the welding current for the keyhole welding.

To achieve the above-mentioned object, the first aspect of the present invention provides a plasma arc welding method for continuously welding a welding target area of a welding workpiece while forming a keyhole in the welding target area of the welding workpiece by a plasma arc. In the welding method, a pulse current is used as the welding current, and the pulse frequency of the pulse current is controlled to match the frequency that synchronizes with the weld pool formed in the back face of the base metal during the welding.

With such welding method, it is possible to control the oscillation of the weld pool during the keyhole welding such that the oscillation of the weld pool synchronizes with the pulse frequency of the pulse current. Accordingly, a stable penetration bead having a desired height can be reliably obtained without dripping (dropping) and irregularities.

The second aspect of the present invention provides another plasma arc welding method for continuously welding a welding target area of a welding workpiece while forming a keyhole in the welding target area of the welding workpiece by a plasma arc. The welding method includes the step of supplying a pulse current as the welding current (pulse current supply step), and the step of controlling the pulse frequency of the pulse current to a frequency that synchronizes with the weld pool (pulse frequency control step).

With such welding method, it is possible to control (cause) the oscillation of the weld pool formed in the back face of the base metal during the welding to synchronize with the pulse frequency of the pulse current. Therefore, it is possible to surely obtain a stable and desired-height penetration bead without dripping (dropping) and irregularities.

The third aspect of the present invention provides another plasma arc welding method defined by the first or second aspect of the invention, wherein the pulse frequency of the pulse current is controlled such that the pulse frequency of the pulse current is equal to or more than 0.8 times the natural frequency of the weld pool and no more than 3.0 times the natural frequency of the weld pool. By controlling the pulse frequency of the pulse current in this manner, it is possible to surely obtain the penetration bead having a gentle shape and a desired height, without dropping and irregularities. The reason why the pulse frequency of the pulse current is between 0.8 times the natural frequency of the weld pool and 3.0 times the natural frequency of the weld pool is because interference between the plasma arc and the weld pool becomes large if the pulse frequency of the pulse current is beyond the above-mentioned range. The large interference between the plasma arc and the weld pool increases a possibility of irregular bead and dropping.

The fourth aspect of the present invention provides another plasma arc welding method defined by the third aspect of the invention, wherein the method further includes controlling a peak or base value of the pulse current or a pulse width of the pulse current, in addition to controlling the pulse frequency of the pulse current. Such control can reliably provide a penetration bead having a gentle shape and a desired height, without dropping and irregularities, even if the pulse frequency of the pulse current is close to the limit values of the above-mentioned range, i.e., between 0.8 times the natural frequency of the weld pool and 3.0 times the natural frequency of the weld pool.

The fifth aspect of the present invention provides another plasma arc welding method defined by the first or second aspect of the invention, wherein the pulse frequency of the pulse current is controlled such that the pulse frequency of the pulse current is equal to or more than 1.0 times the natural frequency of the weld pool and no greater than 2.0 times the natural frequency of the weld pool. By controlling the pulse frequency of the pulse current in this manner, it is possible to surely obtain the penetration bead having a gentle shape and a desired height without dropping and irregularities.

The sixth aspect of the present invention provides another plasma arc welding method defined by the fifth aspect of the invention, wherein the method further includes controlling a peak or base value of the pulse current or a pulse width of the pulse current, in addition to controlling the pulse frequency of the pulse current. Such control can reliably provide a penetration bead having a gentle shape and a desired height without dropping and irregularities, even if the pulse frequency of the pulse current is close to the limit values of the above-mentioned range, i.e., between 1.0 times the natural frequency of the weld pool and 2.0 times the natural frequency of the weld pool.

The seventh aspect of the present invention provides a plasma arc welding device for continuously welding a welding target area of a welding workpiece while forming a keyhole in the welding target area of the welding workpiece by use of a welding torch. The welding torch is configured to generate a plasma arc. The plasma arc welding device includes a pulse current supply unit for supplying a pulse current as the welding current, and a pulse frequency control unit for controlling the pulse frequency of the pulse current to a frequency that synchronizes with the weld pool.

With the device having the above-described configuration, it is possible to control (cause) the oscillation of the weld pool formed in the back face of the base metal during the welding to synchronize with the pulse frequency of the pulse current, as in the second aspect of the present invention. Therefore, it is possible to surely obtain a penetration bead having a gentle shape and a desired height without dripping (dropping) and irregularities.

Advantages of the Invention

The present invention uses the pulse current as the welding current, and adjusts the pulse frequency of the pulse current to a frequency that synchronizes with the weld pool formed in the back face of the base metal during the welding. Therefore, it is possible to surely obtain a penetration bead having a gentle shape and a desired height without dripping (dropping) and irregularities when the keyhole welding is performed.

BEST MODE FOR CARRYING OUT THE INVENTION

Figure 1:
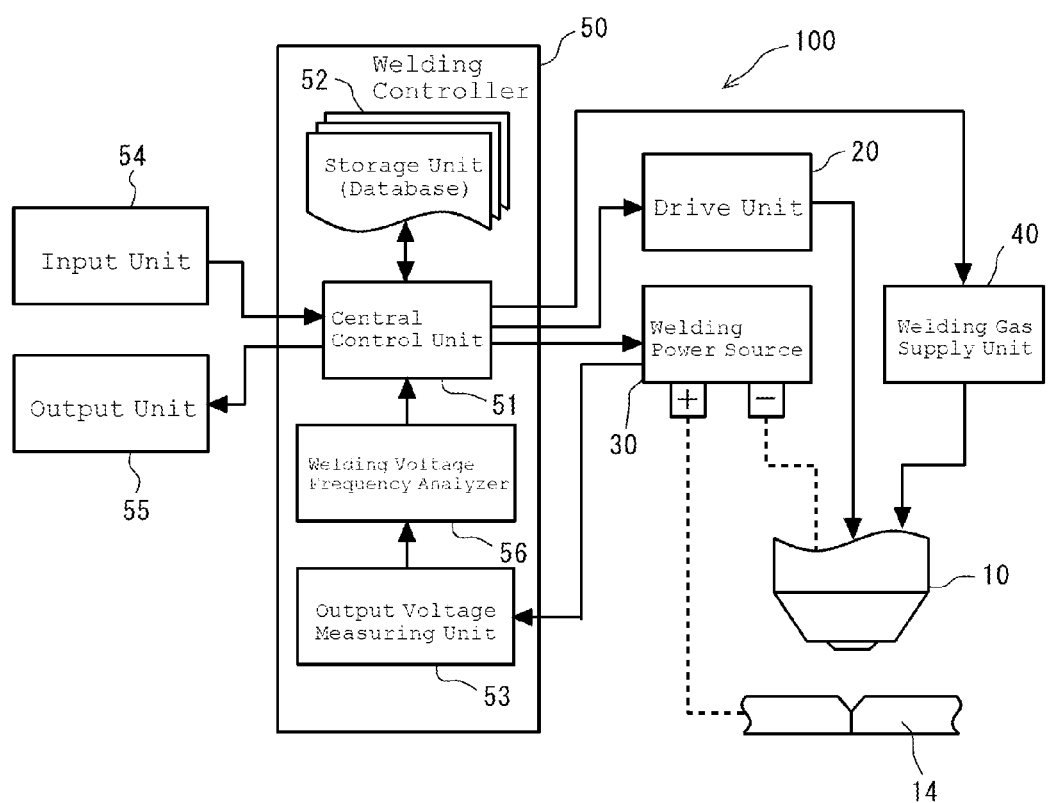
FIG. 1 is a block diagram of a plasma arc welding device 100 according to one embodiment of the present invention.

A plasma arc welding method and a plasma arc welding device according to embodiments of the present invention are now described with reference to the accompanying drawings. FIG. 1 is a block diagram showing a configuration of a plasma arc welding device 100 according to the present invention. As illustrated, the plasma arc welding device 100 includes, as its major components, a welding torch 10, a drive unit 20 for driving the welding torch 10, a power source 30 for feeding electricity to the welding torch and the welding workpiece for welding, a gas supply unit 40 for supplying the welding torch with a welding gas, and a welding controller 50 for controlling the welding torch 10, drive unit 20, power source 30 and gas supply unit 40.

Figure 2:
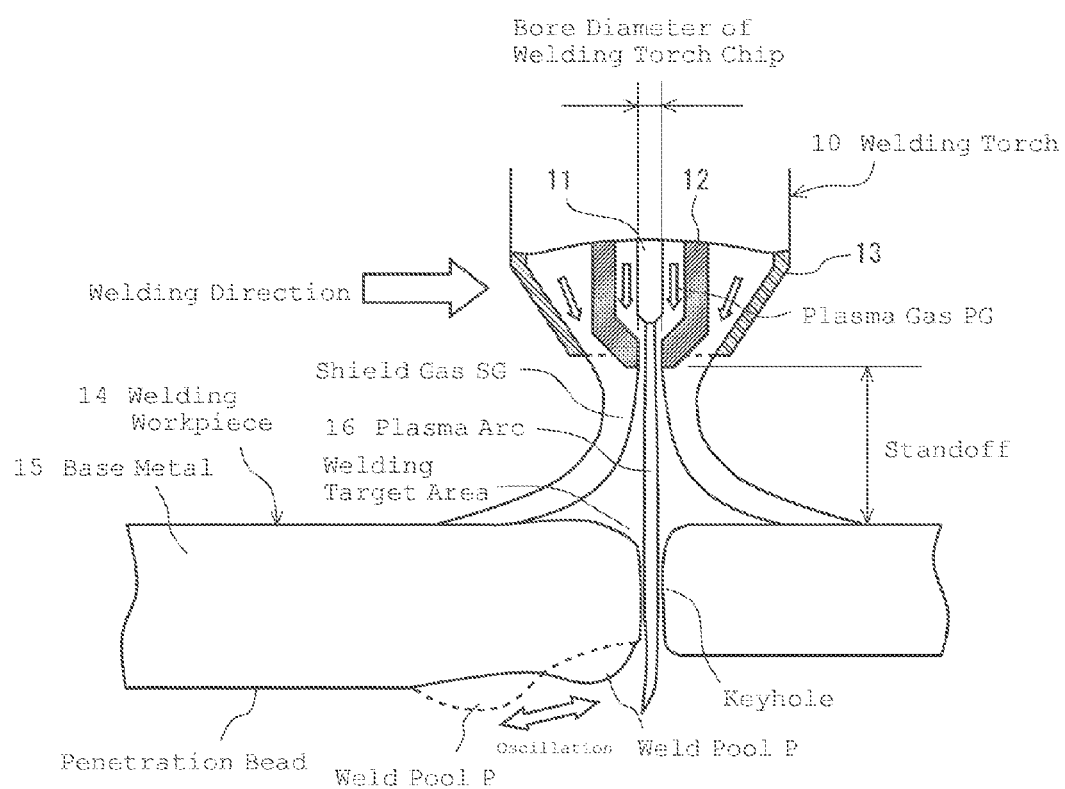
FIG. 2 is a conceptual view showing a behavior of a weld pool P formed on a back face of a base metal 15 during the welding.

As shown in FIG. 2, the welding torch 10 has a tungsten electrode 11 which is covered with a welding torch chip 12. The welding torch 10 also has a shield cap 13 for shielding the welding torch chip 12. A high frequency generator (not shown) is used to generate a pilot arc between the tungsten electrode 11 and the welding torch chip 12. Then, a working gas such as argon (Ar) gas flows in the welding torch chip 12. The working gas is "plasma gas PG" in the drawing. The plasma gas PG is ionized by the heat of the arc to become a good conductor of the arc current, and a plasma arc 16 is generated at a super high temperature (10000-20000 degrees C.) between the tungsten electrode 11 and the matrix (welding based metal) 15. The plasma arc 16 is allowed to penetrate the base metal 15 from the front face (upper face) of the base metal to the back face (lower face) to enable the keyhole welding. Between the welding torch chip 12 and the shield cap 13, supplied is a shield gas SG that includes argon (Ar) and hydrogen ($H_2$), argon (Ar) and oxygen ($O_2$), argon (Ar) and carbon dioxide gas ($CO_2$), or the like. The shield gas SG protects the welding target area from the atmosphere to maintain the welding quality.

Figure 3:
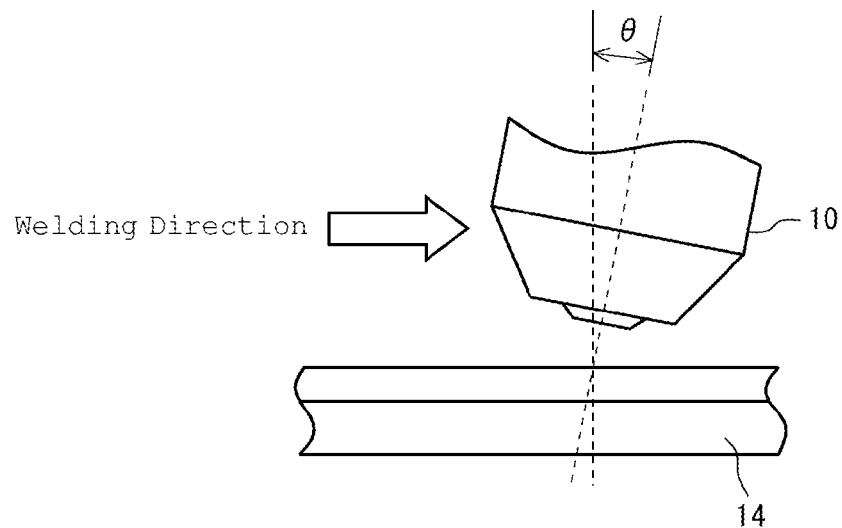
FIG. 3 is a conceptual view of welding, with a welding torch 10 being inclined relative to the welding workpiece 14 at a predetermined angle θ (theta).

As shown in FIG. 3, for example, the drive unit 20 supports and fixes the welding torch 10 at a predetermined distance from the welding workpiece 14 and at a predetermined angle theta relative to the welding workpiece 14. The drive unit 20 causes the welding torch 10 to move (travel) along the welding line of the welding workpiece 14 at a desired speed in response to a control signal received from the welding controller 50. It should be noted that the drive unit 20 may fixedly support the welding workpiece 14 and may cause the welding torch 10 to move relative to the welding workpiece 14. It should be also noted that the drive unit 20 may fixedly support the welding torch 10 and may cause the welding workpiece 14 to move, or cause both the welding torch 10 and the welding workpiece 14 to move (travel) simultaneously.

Figure 4:
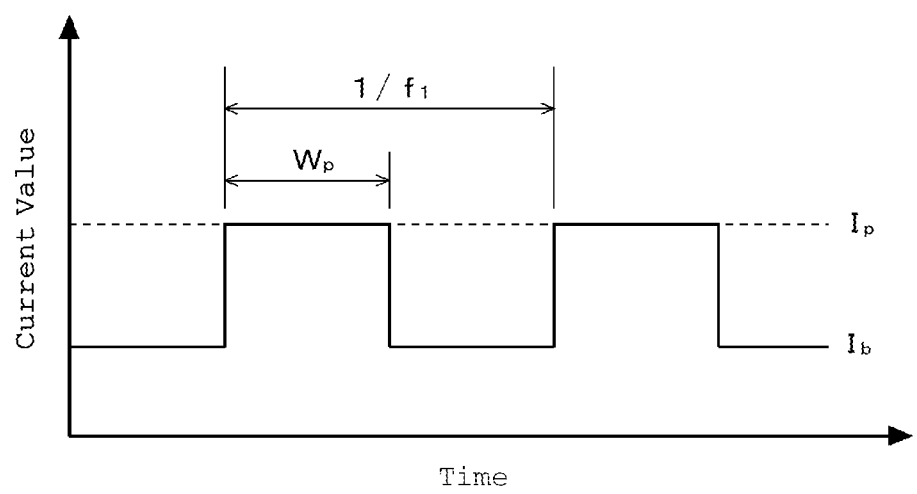
FIG. 4 shows a waveform of a pulse current used in the method according to the present invention.

The welding power source 30 feeds a predetermined voltage to provide a necessary current to generate the plasma arc 16 between the welding torch 10 and the base metal 15. The current value and the voltage value are precisely controlled by the welding controller 50. The welding power source 30 supplies a pulse current having, for example, a rectangular waveform, as shown in FIG. 4. FIG. 4 depicts one example of the waveform of the pulse current supplied from the welding power source 30. $I_p$ designates a peak current, $I_b$ designates a base current, $w_p$ designates a pulse width, and $f_1$ designates a pulse frequency. The gas supply unit 40 supplies the welding torch 10 with the welding gas, such as the plasma gas and the shield gas. The gas flow rate, gas supply timing and the like of the gas supply unit are appropriately controlled by the welding controller 50.

The welding controller 50 includes a central control unit 51, a storage unit (database) 52, an output voltage measuring unit 53, a welding voltage frequency analyzer 56, an input unit 54 and an output unit 55. The central control unit 51 has information processing devices (e.g., CPU, ROM, RAM, and input/output interface) for the computer system and other components. The central control unit 51 controls the above-mentioned components 10-40 and other components based on the operation instructions entered from the input unit 54 and/or appropriate control programs.

The storage unit (database) 52 is a storage device including HDD and semiconductor memories, which enables the data writing and reading. The storage unit 52 stores not only various control programs but also, at least, various welding conditions as well as data about the different natural frequencies of the weld pool to be formed on the back face of the base metal 15 during the welding for the respective welding conditions. The programs and data in the storage unit are writable and readable.

As such, the storage unit (database) 52 stores, at least, a plurality of welding conditions and the information about the natural frequencies of the weld pool P, which correspond to the respective welding conditions, in the form of database. Each (each set) of the welding conditions uniquely decides the natural frequency of the weld pool P. The welding conditions may include conditions related to the welding workpiece 14 and conditions related to the welding work. The conditions related to the welding workpiece 14 may include the material (type of the base metal), the plate thickness t (see FIG. 5), the groove angle θ (theta), and the root length r. The conditions related to the welding work may include the welding current, the welding speed, the pilot gas flow rate, the pilot gas composition, the shield gas composition, the bore diameter of the welding torch chip, the standoff (gap between the base metal 15 and the welding torch chip 12), and the angle of the welding torch 10 to the welding workpiece 14 (see FIG. 3).

The output voltage measuring unit 53 measures, always or at desired timing, the output voltage of the welding power source 30 and sends the measured output voltage to the welding voltage frequency analyzer 56 and the central control unit 51. The input unit 54 may have various types of input devices such as a keyboard and a mouse. The welding conditions and operation commands/instructions are entered from the input unit 54. The output unit 55 may have various types of output devices such as a monitor device (e.g., CRT and LCD) and a speaker. The output unit 55 displays the welding conditions entered from the input unit 54 to confirm the accurate entering of the welding conditions. The output unit 55 also displays information such as various situations of the on-going welding. It should be noted that the output unit 55 may have a touch panel or the like in its monitor screen, which provides the output unit with an additional function, i.e., input function. Then, the output unit 55 may also be able to function as the input unit 54.

Figure 6:
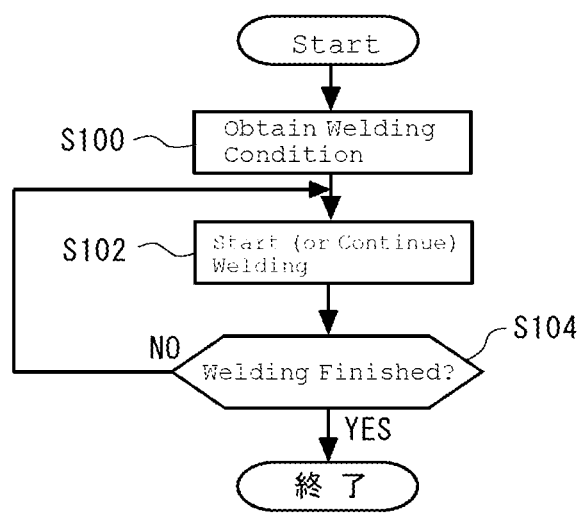
FIG. 6 is a flowchart showing the processing executed in the plasma arc welding method according to the present invention.

An example of the plasma welding method executed by the plasma arc welding device 100 having the above-described configuration is shown in the flowchart shown in FIG. 6. Upon receiving the conditions related to the welding workpiece 14 and the welding start command from the input unit 54, the welding controller 50 (central control unit 51) of the welding device 100 proceeds to the first step, Step S100, to select and retrieves an optimal welding work condition, which most fits the conditions related to the welding workpiece 14, from the storage unit (database) 52. Then, the controller proceeds to Step S102.

At Step S102, the controller uses the welding power source 30 to set the pulse frequency of the pulse current to be equal to the frequency that synchronizes with the weld pool P, and starts the welding. Then, the welding controller 50 (central control unit 51) proceeds to the last step, Step S104, to determine whether or not the welding work is finished. If it is determined that the welding work is finished (YES), the controller terminates the processing. If it is determined that the welding work is not finished (YES), the controller returns to Step S102 and continues the welding work.

FIGS. 7A-7B, FIGS. 8A-8C and FIGS. 9A-9C depict influences of the pulse frequency ($f_1$) of the pulse current on the behavior of the weld pool P, respectively. Specifically, FIGS. 7A and 7B schematically illustrate the behavior (oscillation) of the weld pool P when the pulse frequency ($f_1$) of the pulse current is equal to or greater than 0.8 times the natural frequency ($f_p$) of the weld pool P and no greater than 1.0 times the natural frequency ($f_p$) of the weld pool P ($0.8 \leq f_1/f_p \leq 1.0$).

As shown in FIG. 7A, a wave (oscillation) is created in the weld pool P by a drive force generated by the pulse current as the peak current $I_p$ flows. The wave moves in a direction opposite the welding direction. When the wave arrives at the rear end of the weld pool P, part of the wave becomes solid and creates the penetration bead. The remaining wave is reflected by the rear end of the weld pool P, as shown in FIG. 7B, with the base current $I_b$. This wave moves in the welding direction, and eventually is attenuated as the wave interferes with the plasma arc 16 that penetrates the keyhole. The above-described shaking movement (oscillation) is repeated to form the penetration bead, which has a gentle shape and a desired height without dropping and irregularities.

FIGS. 8A-8C schematically illustrate the behavior (oscillation) of the weld pool P when the pulse frequency ($f_1$) of the pulse current is greater than 1.0 times the natural frequency ($f_p$) of the weld pool P and equal to or less than 2.0 times the natural frequency ($f_p$) of the weld pool P ($1.0 < f_1/f_p \leq 2.0$). As shown in FIG. 8A, which is similar to FIG. 7A, a wave (oscillation) is created in the weld pool P by a drive force generated by the pulse current as the peak current $I_p$ flows. The wave moves in a direction opposite the welding direction. When the wave arrives at the rear end of the weld pool P, part of the wave becomes solid and creates the penetration bead. The remaining wave is reflected by the rear end of the weld pool P with the base current $I_b$. The reflected wave moves in the welding direction. As shown in FIG. 8B, the reflected wave meets (collides with) a new wave of molten metal at an approximate center of the weld pool P before the reflected wave arrives at the front end of the weld pool P. The new wave is generated by the next peak current $I_p$ on the keyhole side, and flows in the direction opposite the welding direction. As these two waves meet each other, the two waves attenuate as shown in FIG. 8C, and the overall oscillation of the weld pool P is reduced (suppressed). Therefore, the burning through is prevented and the interference to the plasma arc 16 is reduced even if an amount of molten metal is large. Accordingly, it is possible to form a penetration bead, which has a gentle shape and a desired height without dropping and irregularities.

FIGS. 9A-9C schematically illustrate the behavior (oscillation) of the weld pool P when the pulse frequency ($f_1$) of the pulse current is greater than 2.0 times the natural frequency ($f_p$) of the weld pool P and no greater than 3.0 times the natural frequency ($f_p$) of the weld pool P ($2.0 < f_1/f_p \leq 3.0$). As shown in FIG. 9A, which is similar to FIG. 7A, a wave (oscillation) is created in the weld pool P by a drive force generated by the pulse current as the peak current $I_p$ flows. The wave moves in a direction opposite the welding direction. In the example of FIG. 9A, however, the peak time (pulse width $w_p$/pulse frequency $f_1$) is short, and therefore an amount of metal that melts while the peak current flows is small. Thus, as shown in FIG. 9B, the oscillation of the weld pool P is smaller than the examples of FIG. 7A and FIG. 8A. Accordingly, the reflecting wave (returning wave) from the rear end of the weld pool is cancelled (counterbalanced) by a new wave (or waves) of molten metal that is (are) generated when the metal is melt by the subsequent peak current(s) $I_p$. In the weld pool P, therefore, as shown in FIG. 9C, created is the wave (oscillation) moving toward the rear end of the weld pool that synchronizes with the pulse frequency, and therefore there is formed a penetration bead, which has a gentle shape and a desired height without dropping and irregularities.

FIGS. 10A-10C schematically illustrate the behavior (oscillation) of the lower weld pool P when the pulse frequency ($f_1$) of the pulse current is less than 0.8 times the natural frequency ($f_p$) of the weld pool P, and when the pulse frequency ($f_1$) of the pulse current is less than 0.8 times the natural frequency ($f_p$) of the weld pool P and greater than 3.0 times the natural frequency ($f_p$) of the weld pool P. In FIGS. 10A-10C, the weld pool P does not synchronize with the pulse frequency ($f_1$) but tends to vibrate at the natural frequency ($f_p$). Thus, as shown in FIGS. 10A and 10B, the molten metal in the weld pool P may interfere with the plasma arc 16 and may close the keyhole temporarily. As a consequence, the plasma arc pushes out the molten metal in a flash when the plasma arc creates the keyhole again, as shown in FIG. 10C. This may result in the welding deficiencies such as sputtering and dropping. Thus, it is difficult to obtain a penetration bead that has a gentle shape and a desired height.

Figure 11:
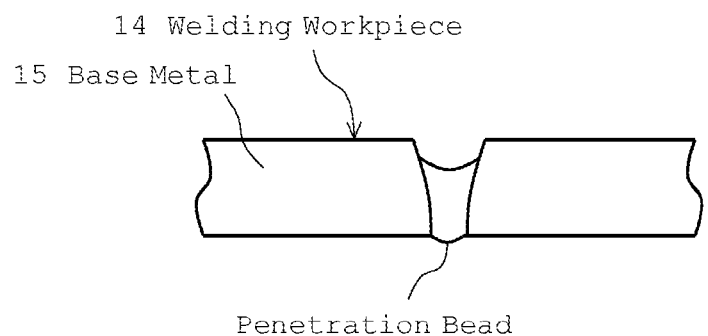
FIG. 11 is a cross-sectional view of the welding target area, taken in the welding direction, after the keyhole welding is finished according to the present invention.

In the present invention, as described above, the pulse current is used as the welding current, and the pulse frequency of the pulse current is controlled to become the frequency that synchronizes with the weld pool P when the welding is performed. As such, the present invention can provide a penetration bead that has a gentle shape and a desired height without dropping and irregularities, as shown in FIG. 11, when the keyhole welding is performed.

It should be noted that the peak current value ($I_p$) of the pulse current may be controlled, the base current value ($I_b$) of the pulse current may be controlled or the pulse width of the pulse current may be controlled as shown in FIG. 4, in addition to controlling the pulse frequency of the pulse current to stay in the predetermined range. Even when the pulse frequency of the pulse current is close to the limit values of the above-mentioned range (between 0.8 times the natural frequency of the weld pool P, and 3.0 times the natural frequency of the weld pool P), i.e., even when the pulse frequency of the pulse current is close to 0.8 times or 3.0 times the natural frequency of the weld pool P, it is still possible to obtain a penetration bead that has a gentle shape and a desired height without dropping and irregularities if the above-mentioned additional control is carried out, i.e., one or more of the peak current value ($I_p$), base current value ($I_b$) and the pulse width are controlled in combination.

It should be noted that among those units (or steps) which constitute the present invention described in the "SOLUTION TO OVERCOME THE PROBLEMS" section, the pulse current supply unit (step) for supplying the pulse current as the welding current is the welding power source 30 shown in FIG. 1.

REFERENCE NUMERALS AND SYMBOLS

Figure 5:
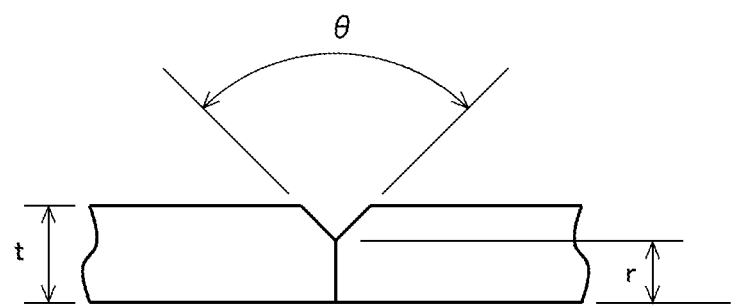
FIG. 5 is an enlarged partial view of a welding workpiece 14 to depict an example of welding conditions related to the welding workpiece.
Figure 7:
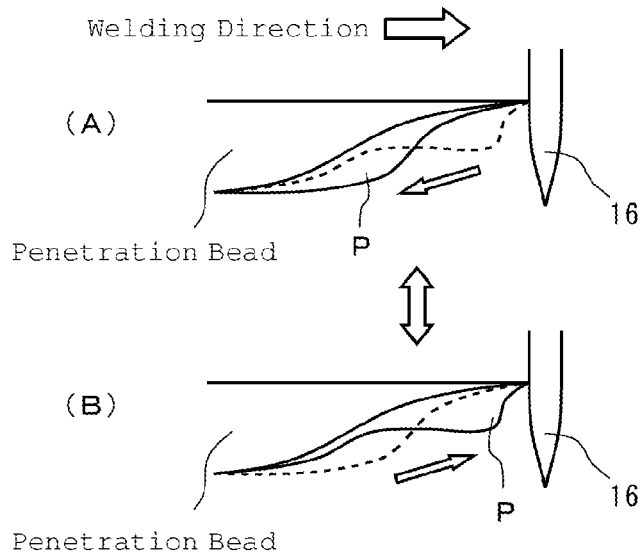
FIG. 7 is a conceptual view illustrating a behavior of a lower weld pool when the frequency of the pulse current is equal to or greater than 0.8 times the natural frequency of the weld pool and no greater than 1.0 times the natural frequency of the weld pool.
Figure 8:
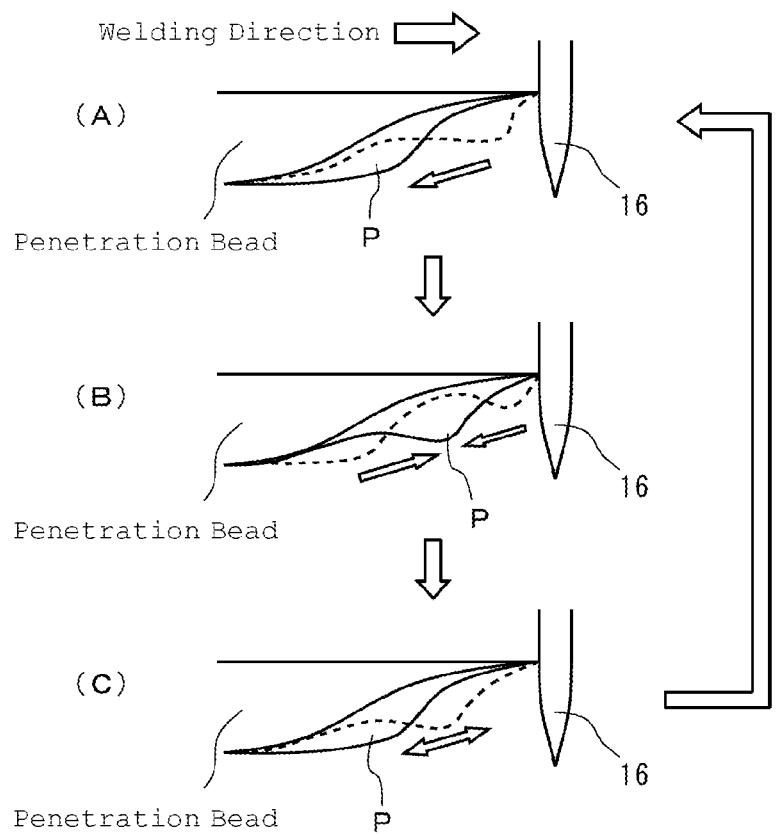
FIG. 8 is a conceptual view illustrating the behavior of the lower weld pool when the frequency of the pulse current is equal to or greater than 1.0 times the natural frequency of the weld pool and no greater than 2.0 times the natural frequency of the weld pool.
Figure 9:
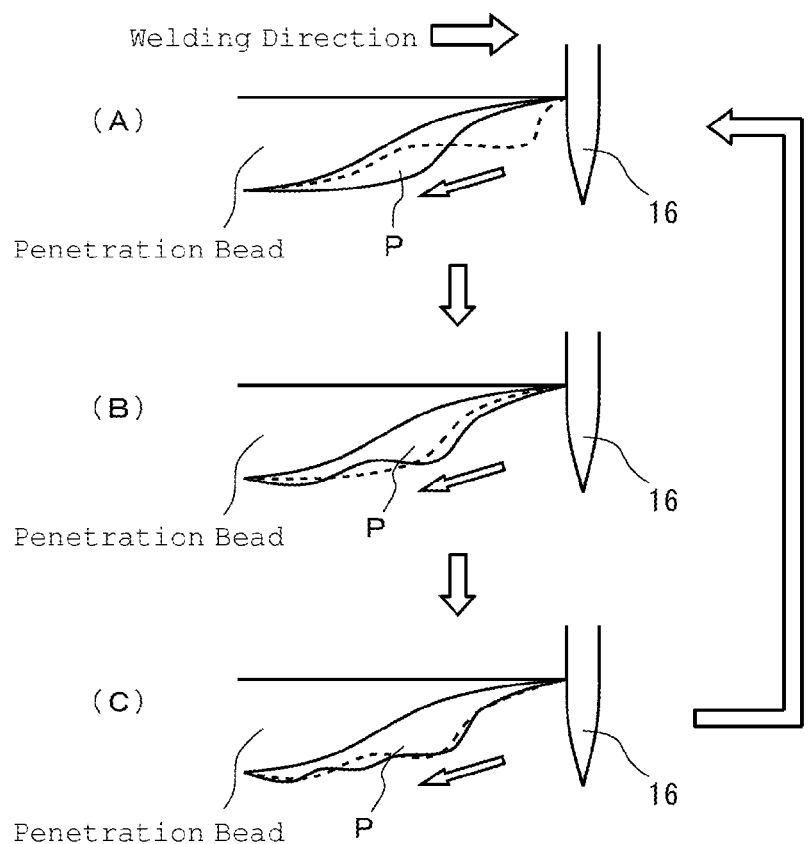
FIG. 9 is a conceptual view illustrating the behavior of the lower weld pool when the frequency of the pulse current is equal to or greater than 2.0 times the natural frequency of the weld pool and no greater than 3.0 times the natural frequency of the weld pool.
Figure 10:
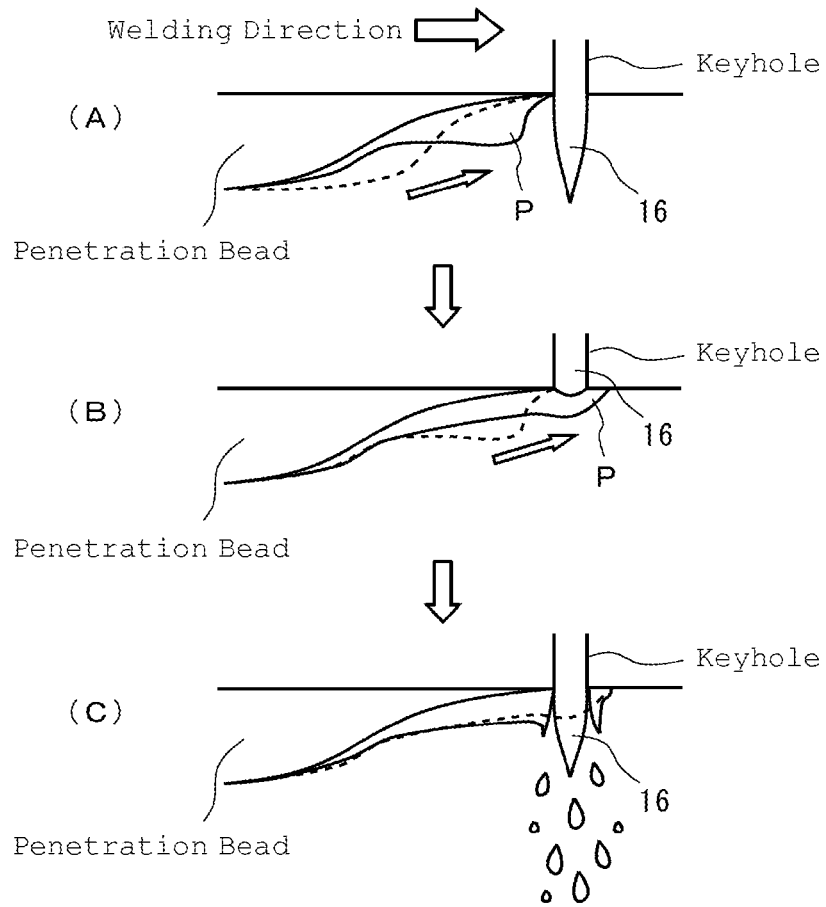
FIG. 10 is a conceptual view illustrating the behavior of the lower weld pool when the frequency of the pulse current is less than 0.8 times the natural frequency of the weld pool and greater than 3.0 times the natural frequency of the weld pool.

100 Plasma Arc Welding Device
100 Welding Torch
12 Welding Torch Chip
13 Shield Cap
14 Welding Workpiece
15 Base Metal
16 Plasma Arc
20 Drive Unit
30 Welding Power Source 40 Welding Gas Supply Unit
50 Welding Controller
51 Central Control Unit
52 Storage Unit (Database)
53 Output Voltage Measuring Unit
54 Input Unit
55 Output Unit
56 Welding Voltage Frequency Analyzer
P Weld Pool
PG Plasma Gas
SG Shield Gas
FIG. 1
   54 Input Unit
   55 Output Unit
   50 Welding Controller
   52 Storage Unit (Database)
   51 Central Control Unit
   56 Welding Voltage Frequency Analyzer
   53 Output Voltage Measuring Unit
   20 Drive Unit
   30 Welding Power Source
   40 Welding Gas Supply Unit
FIG. 2
   Bore Diameter of Welding Torch Chip
   10 Welding Torch
   Welding Direction
   Plasma Gas PG
   Shield Gas SG
   14 Welding Workpiece
   15 Base Metal
   16 Plasma Arc
   Welding Target Area
   Penetration Bead
   Weld Pool P
   Oscillation
   Keyhole
   Standoff
   Weld Pool P
FIG. 3
   Welding Direction
FIG. 4
   Current Value
   Time
FIG. 5
FIG. 6
   Start
   S100 Obtain Welding Condition
   S102 Start (or Continue) Welding
   S104 Welding Finished?
   End
FIG. 7
   Welding Direction
   Penetration Bead
   Penetration Bead
FIG. 8
   Welding Direction
   Penetration Bead
   Penetration Bead
   Penetration Bead
FIG. 9
   Welding Direction
   Penetration Bead
   Penetration Bead
   Penetration Bead
FIG. 10
   Welding Direction
   Penetration Bead
   Penetration Bead
   Penetration Bead
FIG. 11
   14: Welding Workpiece
   15: Base Metal
   Penetration Bead

What is claimed is:

1. A plasma arc welding method for continuously welding a welding target area of a welding workpiece while forming a keyhole in the welding target area of the welding workpiece by a plasma arc, with a pulse current being used as a welding current, the method comprising the steps of:
controlling a pulse frequency of the pulse current such that the pulse frequency takes a value 0.8 to 3.0 times a natural frequency of a weld pool formed on a back side of the welding workpiece during welding, the natural frequency being a frequency of oscillation of the weld pool to form a penetration bead having a stable and predetermined height; and
supplying the pulse current as the welding current.

2. The plasma arc welding method according to claim 1, wherein the step of controlling a pulse frequency of the pulse current includes controlling a peak value of the pulse current, in addition to controlling the pulse frequency of the pulse current.

3. The plasma arc welding method according to claim 1 or 1, wherein the step of controlling a pulse frequency of the pulse current includes controlling the pulse frequency of the pulse current such that the pulse frequency of the pulse current is equal to or more than 1.0 times the natural frequency of the weld pool and no greater than 2.0 times the natural frequency of the weld pool.

4. The plasma arc welding method according to claim 1, wherein the step of controlling a pulse frequency of the pulse current includes controlling a base value of the pulse current, in addition to controlling the pulse frequency of the pulse current.

5. The plasma arc welding method according to claim 1, wherein the step of controlling a pulse frequency of the pulse current includes controlling a pulse width of the pulse current, in addition to controlling the pulse frequency of the pulse current.

* * * * *